United States Patent [19]
Wilde

[11] 4,088,730
[45] May 9, 1978

[54] METHOD AND APPARATUS FOR FORMING CLOSURE INSERTS

[75] Inventor: Sheldon L. Wilde, Crawfordsville, Ind.

[73] Assignee: H-C Industries Inc., Crawfordsville, Ind.

[21] Appl. No.: 678,907

[22] Filed: Apr. 21, 1976

Related U.S. Application Data

[60] Division of Ser. No. 529,823, Dec. 5, 1974, Pat. No. 3,958,910, which is a continuation-in-part of Ser. No. 388,458, Aug. 15, 1973, abandoned.

[51] Int. Cl.² ............................................. B29C 13/02
[52] U.S. Cl. ..................................... 264/268; 264/291
[58] Field of Search ...................... 264/291, 46.6, 268, 264/292

[56] References Cited
U.S. PATENT DOCUMENTS

| | | | |
|---|---|---|---|
| 2,840,858 | 7/1958 | Rainer et al. | 264/268 |
| 2,881,480 | 4/1959 | Waters | 264/268 |
| 3,101,992 | 8/1963 | Cooke et al. | 264/268 |
| 3,444,281 | 5/1969 | Cahill et al. | 264/46.6 |
| 3,564,602 | 2/1971 | Peck | 264/46.6 |

*Primary Examiner*—Donald J. Arnold

*Attorney, Agent, or Firm*—Dressler, Goldsmith, Clement, Gordon & Shore, Ltd.

[57] ABSTRACT

A plunger for forming thermoplastic material disposed in a closure shell into a closure insert with a cushion pad or bead by sealing the material between the crown and working surface of the plunger and flexing a portion of the working surface to form the material into the desired shape. The plunger includes a punch, elastomeric material and a sealing means. In one embodiment, the plunger comprises a reciprocal punch having a lower end surrounded by cylindrically-shaped elastomeric material, and sealing means that is disposed about the outer wall of the elastomeric material and has a lower ledge contacting the bottom surface of the elastomeric material. A spring means maintains the elastomeric material in sealing engagement with the punch and sealing means, and maintains the punch, elastomeric material, and sealing means in mechanical engagement. The outer diameter of the lower portion of the plunger is less than the inner diameter of the sealing means to provide a gap therebetween, which facilitates in the alignment of the closure shell beneath the plunger, and enables the sealing means to move relative to the plunger to accommodate any skewness between the plunger and the closure shell.

4 Claims, 19 Drawing Figures

METHOD AND APPARATUS FOR FORMING CLOSURE INSERTS

This is a division of application Ser. No. 529,823, filed Dec. 5, 1974, now U.S. Pat. No. 3,958,910, which is a continuation-in-part of application Ser. No. 388,458, filed Aug. 15, 1973, and now abandoned.

BACKGROUND OF THE INVENTION

Closure shells, such as crowns, lug or screw caps for bottles and jars, have been steadily improved with the growth of technological knowledge. Closures not only protect against contamination of the contents of bottles and jars, but also provide a sealing barrier to insure freshness of the products contained therein. In the past, closures have been provided with some sort of gasket or sealing material to provide a sealed volume within the containers, such as glass mason jars which were equipped with a separate rubber gasket which sealed the cap or top to the container portion of the jar. With the introduction of metallic closures, such as bottle caps or crowns, the gasket was replaced with a cork insert which covers the entire top interior of the crown so that the bottle was sealed and no metal could be contacted by the contents of the bottle. In this manner, the crown material could not adversely affect the contents of the bottle.

With the advance of chemical technology, the cork insert has gradually been replaced with a plastic insert, such as polyvinyl chloride (PVC). These plastic crown inserts are normally formed by two methods. In the first method, the polyvinyl chloride is molded while in the plastisol state by a one-piece plunger. This plunger seals against the sides or skirt of the crown and forms the plastisol into shape with a relatively small pressure exerted by the plunger, e.g., Ranier et al., U.S. Pat. No. 2,840,858.

In the second method, the inserts are formed from polyvinyl chloride while it is in a melt condition. In this method, a globule of PVC in some random shape is deposited in the crown and a plunger is introduced into the crown to press the PVC into the desired shape.

One apparatus for forming inserts according to this latter method is disclosed in Aichele, U.S. Pat. No. 3,135,019. The Aichele plunger consists of a rigid center punch of circular cross-sectional area which forms the central portion of the crown insert and causes the PVC to flow. Mounted concentrically with the plunger and axially slidable relative thereto is a spring loaded cushion or gasket forming die which is forced upwardly relative to the punch by the spreading PVC to form the gasket portion of the insert. Mounted coaxially with but outwardly of the cushion forming die and punch is a tapered fender sleeve which is introduced into the crown before the other components to form a sealed volume between the crown surface and the plunger components, thereby preventing the PVC from escaping while it is being compressed by the punch.

While the Aichele plungers produce acceptable inserts, the components of the punch, due to the very limited working space of the crown, necessarily require close dimensional tolerance. These plungers are costly to manufacture, not only due to their high tolerance requirements, but also due to the number of supporting components, i.e. precision loading springs for the cushion forming die and fender sleeves, as well as maintenance costs.

An alternate high-pressure insert plunger is disclosed in Schneider, U.S. Pat. No. 2,823,422, wherein a heated, one-piece, metallic plunger forms a crown insert. The Schneider plunger has a central forming surface, and an annular related portion joined with a peripheral rib. As the plunger is introduced into the crown, the central forming surface starts the thermoplastic material flowing; the rib then engages the corner radius of the crown to prevent flashing of the thermoplastic material from the bottom of the crown. As the plunger continues downwardly forming the insert, the rib forces the crown to deform, thus maintaining the seal and preventing flashing.

During the formation of thermoplastic inserts, two problems have plagued the industry. Since the plungers are generally mounted vertically and reciprocated into a crown disposed therebeneath, it is necessary that certain criteria be met: (1) that the crown be positioned as close as possible directly below the plunger, i.e. alignment must be maintained between the working surface of the plunger and the crown, and (2) that the center line of travel of the plunger be perpendicular to the surface of the crown.

If the crown is slightly out of alignment, the crown will be self-aligned by the plunger as it enters the crown. However, if the edge of the crown sidewall is beyond the lateral edge of the plunger, the crown will be crushed by the plunger. This aligning problem is generally solved by providing a centering recess in the anvil or platen on which the crown is positioned.

The second criterion involves skewness of the plungers which is caused by tolerance deviations in (1) the center line of the plunger supports, and/or (2) in the plunger shaft. The plungers are normally positioned by two vertically spaced guides in which the plunger shafts are reciprocated. When a rigid plunger enters a crown askew from the perpendicular, the plunger will only partially seal the thermoplastic material within the crown with the result that the material will flash under the unsealed portion of the plunger as it is formed, and a defective insert will be formed. Only by close tolerance machining of the guides and plunger shaft may this problem be alleviated. Since crown liner machines generally have a plurality of plungers, this part of the machine is a prime cost factor in the manufacture of crown machines. Additionally, the plunger is heated in many machines, either directly or by heat transfer from the thermoplastic material, with the result that thermal expansion may warp the plunger shaft.

SUMMARY OF THE INVENTION

The present invention relates to an improved method and apparatus for forming crown liner inserts of plastic materials, such as polyvinyl chloride, in crowns or caps for containers, such as bottles.

The plunger of the present invention utilizes a reciprocal punch with a circular cross-section elastomeric molding tip at its end to form the crown insert. The periphery of the molding tip has a crown sealing edge which may be in the form of a frusto-conical shaped washer bonded to the lower surface of the elastomeric material, or a cylindrical sealing member (washer) surrounding and contacting the outer wall and a portion of the bottom wall of the elastomeric material, which washer is mechanically maintained in position by a spring means which precompresses the elastomeric material. The inner edge of the washer is spaced from the punch to provide an annular shaped, transition portion of the elastomeric working surface intermediate the punch and washer.

By utilizing an elastomeric tip, the sealing edge will resiliently engage a crown positioned therebeneath as the punch is reciprocated to assure a complete seal. This permits the plunger to be slightly askew and still function properly to seal the PVC in the crown.

Thus the present invention solves the perpendicularity problem more economically and more practically than is possible with rigid plungers. After an initial volume defined by the working surface of the plunger and crown has been sealed by the edge of the washer, the central portion of the elastomeric block is flexed inwardly into the crown against the thermoplastic material forcing it to spread laterally.

The areas of flexure and pressure thereon are designed so that a central area receives maximum pressure, and the transitional portion receives less pressure and thereby flexes to a lesser extent than the central portion. This controlled flexing produces an insert with a generally flat central portion beneath the punch and an annular cushion pad or gasket of greater thickness surrounding the central portion.

In the disclosed embodiments, the plunger is circular or polygonal in cross-section and produces the central flattened portion of the insert. The elastomeric material is circular in cross-section and is positioned at the end of the plunger to provide at least an annular flexible working surface. The washer is positioned in abutment with the lower peripheral working surface of the elastomeric material and cooperates with the elastomeric material to form a generally triangular cross-section cushion pad. The flexed transitional portion forms the PVC into one slope of the cushion pad adjacent the flattened central portion of the insert and the lower surface of the washer forms the PVC into the other slope of the cushion pad. The washer diameter is generally equal to the diameter of the bottom portion of the closure shell so that the plunger may enter the shell and the insert formed will cover the bottom surface thereof. While the washer is a preferred sealing means, it is within the concept of the present invention to treat the periphery of the elastomeric material so that it may seal against the shell.

In the preferred embodiment, the elastomeric material is cylindrical in shape and abuts the lower end of the sidewall of the punch, with the bottom surface of the elastomeric material being positioned higher than the bottom surface of the punch. The sealing member abuts the outer wall of the elastomeric material, and a peripheral portion of the upper and bottom surfaces of the elastomeric material. A precompressing means, which may comprise a spring means, precompresses the elastomeric material and maintains the punch, elastomeric material, and sealing member in mechanical engagement. When the plunger is lowered, the sealing member contacts the shell which prevents further downward movement of the sealing member. The punch and elastomeric material continue their downward movement, the elastomeric material is flexed, the portion of the elastomeric material between the punch and the sealing means is stressed, and the insert is formed.

In another embodiment, the elastomeric material is cylindrical in shape and bonded to the punch so that its lower surface is flush with the end of the punch. When the punch flexes the elastomeric material, it stresses the transitional portion in tension to form the insert.

Alternative embodiments utilize elastomeric material which covers the lower end of the punch. These embodiments provide a resilient working surface interior to the washer. The elastomeric material beneath the end of the punch is subjected to compression and readily accommodates slight fluctuations in the amount of material deposited in the crown so that a complete insert may be formed.

In these alternate embodiments, the transitional portion is also flexed in compression. To produce compression, as well as mount the elastomeric material, the punch is provided with an annular flange spaced upwardly from its lower end. The diameter of the flange is generally equal to the diameter of the transitional portion and produces less compression thereof, as compared to the material below the end of the punch, due to the additional amount of elastomeric material therebetween.

Depending on the nature and type of elastomeric material and the thermoplastic material, it is sometimes desirable to resiliently load the sealing edge of the washer beyond the loading provided solely by the elastomeric material. To this end, two means for additionally loading the washer are disclosed.

The first means utilizes a punch with an annular flange similar to the one described above, with an annular shoulder which corresponds in diameter to the elastomeric material and is spaced upwardly from the flange. The upper surface of the elastomeric material is in abutment with the lower surface of the shoulder so that, when the punch moves downwardly into the shell, the shoulder compresses the elastomeric material extending beyond the flange and loads the washer.

The second means for additionally loading the washer incorporates a plurality of leaf springs which are embedded in the elastomeric material. One end of each spring engages the upper surface of the washer above the sealing edge and the other end of the spring contacts the lower surface of the flange. As the punch moves into engagement with the shell, the flange compresses the springs and loads the sealing edge of the washer.

In a still further embodiment, a punch having a reduced diameter portion above the working surface is utilized and the elastomeric material is precompressed on the punch to provide sealing engagement therewith while allowing the elastomeric material to be flexed. The elastomeric material is bonded to the punch, and the washer is bonded to the elastomeric material.

Numerous other advantages and features of the present invention will become readily apparent from the following detailed description of the invention and the embodiments thereof, from the claims and from the accompanying drawings, in which like numerals refer to like parts.

DETAILED DESCRIPTION OF THE PREFERRED EMBODIMENT

While this invention is susceptible of embodiment in many different forms, there is shown in the drawings and will herein be described in detail, a preferred embodiment of the invention and modifications thereof, with the understanding that the present disclosure is to be considered as an exemplification of the principles of the invention and is not intended to limit the invention to the embodiments illustrated.

Referring to the drawings, the pre-shaped closure shell 10, generally made of sheet metal such as aluminum, has a bottom portion 12 and a sidewall 14 extending therefrom. A predetermined amount of thermoplastic material 16, such as polyvinyl chloride, is fed into the bottom portion 12 of the shell 10. The thermoplastic material 16 may be random in shape or receive a shape from its feeding mechanism (not shown). Preferably, the thermoplastic material 16 is centrally disposed in the bottom portion 12 of the shell so that it spreads uniformly under the influence of the plunger. The present invention is, however, capable of forming inserts of the thermoplastic material even if the material is not centered in the bottom portion 12 of the shell.

The shell 10 is disposed in an inverted position below the plunger, as clearly shown in FIGS. 1, 5, 12 and 16 on an anvil 18 which may be recessed 19 to locate the shell directly beneath and align it with the plunger. The plunger serves the purpose to form the thermoplastic material 16 into sealing inserts 20 which have a central portion 22 and an annular bead or cushion pad 24. (See FIGS. 3, 4, 7, 8, 14, 15, 18 and 19.)

Referring to FIGS. 1–4, a plunger 30 used for this purpose consists of a circular cross-sectioned punch 32 which is reciprocated vertically into the shell 10 by suitable means (not shown). A cylindrical block of elastomeric material 34, such as silicone rubber, polyurethane, or various other thermoplastic or thermosetting materials, having an inner diameter corresponding to the diameter of punch 32 is bonded thereto at its lower end. The elastomeric block 34 may be unitary or formed of sections which are bonded to the punch 32. The lower surface 36 of the elastomeric block 34 defines a horizontal, flat working surface, referred to as the transitional portion, which is flush with the end of the punch 32 to form a continuous flat working surface.

Sealing means adapted to seal the thermoplastic material 16 within the shell 10, may be in the form of a frusto-conical shaped washer 38 which is bonded to the lower surface of the elastomeric material 34 at its outer periphery. The inner lower edge 38a of the washer is flush with the working surface 36 of the elastomeric material to form an inverted dish-like initial working surface by virtue of the inclined working surface 38c of the washer, and the outer edge of the washer 38 forms a sealing edge 38b. The outer diameter of the washer 38 and the elastomeric material 34 are coterminous and generally equal to the diameter of the bottom portion 12 of the shell 10 so that the plunger 30 may enter the shell.

Figure 1:
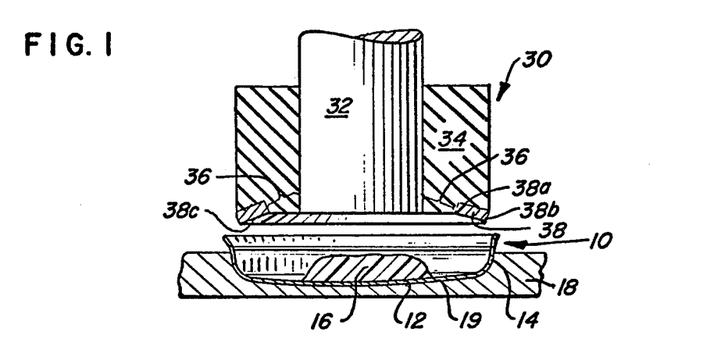
FIG. 1 is a front elevational view, partially in section, of a plunger structure preparatory to insertion in a closure shell.
Figure 2:
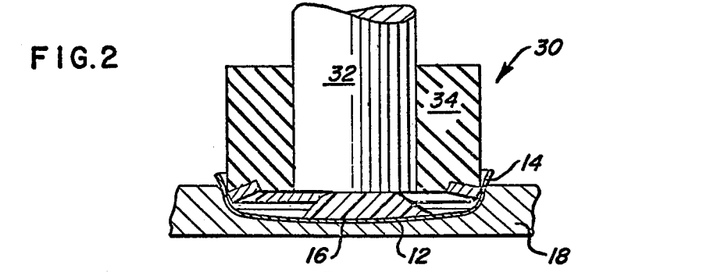
FIG. 2 is a front elevational view partially in section, of the plunger shown in FIG. 1, in the sealing position.
Figure 3:
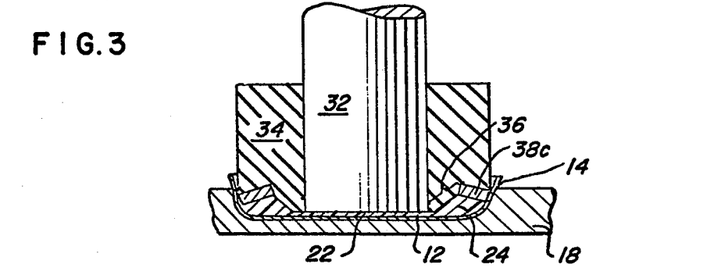
FIG. 3 is a front elevational view, partially in section, of the plunger structure in the insert forming position.
Figure 4:
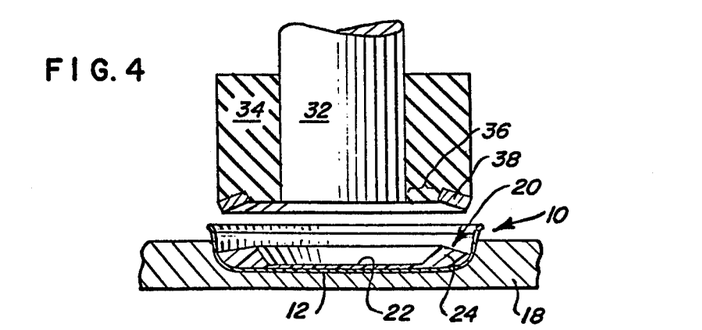
FIG. 4 is a front elevational view, partially in section, of the plunger in the withdrawn position after forming the sealing insert.

As the plunger 30 is reciprocated downwardly, the sealing edge 38b of the washer engages shell 10 to define an outer boundary of the insert 20. After the sealing edge 38b has engaged the shell 10, the punch 32 continues to move downwardly deforming the initial working surface and causing the thermoplastic material 16 to flow. As the punch 32 moves downwardly, the lower end functions as a working surface to form the central portion 22 of the insert and stretches the elastomeric material in the transitional portion to form the interior slope of the bead 24. The transitional portion 36 cooperates with the working surface 38c of the washer 38 to complete formation of the cushion pad 24, as illustrated in FIG. 3.

Since the elastomeric material 34 is bonded to the punch 32 in the embodiment illustrated in FIGS. 1–4, the downward movement of the punch 32, after the shell has been contacted, causes the elastomeric material to stretch. The stretching of the material produces a load on the washer 38 to maintain resilient loading on the sealing edge 38b which compensates for any skewness of the plunger. The punch 32 moves downwardly until it reaches a mechanical stop (not shown) or is stopped by the incompressibility of the thermoplastic material 16 when it achieves the shape of the insert 20. At this time, the insert 20 has been formed and the plunger 30 is reciprocated upwardly out of engagement with the shell 10, the shell is removed from beneath the plunger and a new shell is positioned therebeneath.

Referring to FIGS. 5–9, an alternate embodiment of the plunger 30 is illustrated in which the elastomeric material 134 covers the lower end of the punch 132 so that the entire working surface interior to the washer 138 is resilient. The alternate embodiment utilizes a punch 132 which may be circular in cross-section, FIG. 5, or polygonal in cross-section, FIG. 9.

Figure 5:
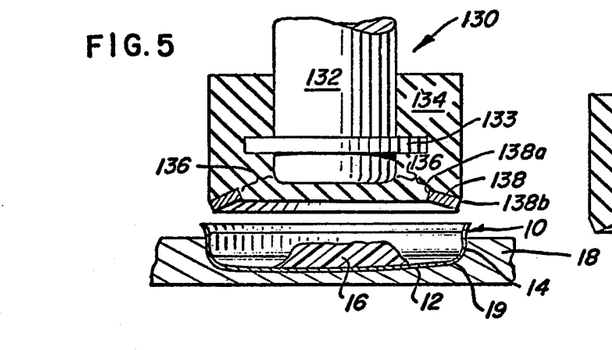
FIGS. 5, 6, 7 and 8 are front elevational views, partially in section, of another plunger structure illustrating its operation in positions similar to those shown in FIGS. 1, 2, 3 and 4, respectively.

Referring to FIG. 5, the punch 132 is provided with an annular flange 133 spaced upwardly from the lower end of the punch. Flange 133 has an outer diameter corresponding to the outer diameter of the transitional portion 136 of the elastomeric material 134. The elastomeric material 134 is similar to that described above except that the material extends below the lower end of the punch 132 to provide a resilient working surface therebeneath. The elastomeric material may be unitary, or in sections, and bonded to the punch 132 depending upon the hardness and modulus of elasticity of the material used. A frusto-conical shaped washer 138 is bonded to the lower surface of the elastomeric material at its outer peripheral portion to provide a sealing edge 138b. The interior edge 138a of the washer is disposed complementary with the resilient working surface of the elastomeric material 134 to provide a continuous working surface.

Figure 6:
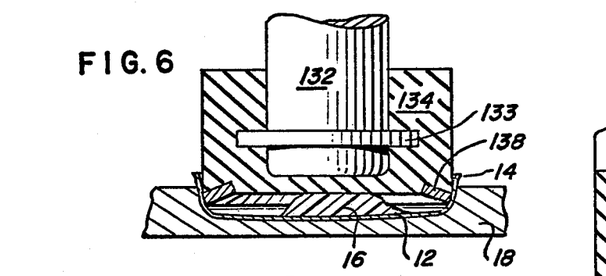
Figure 7:
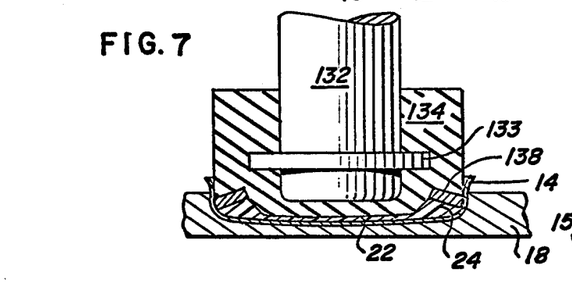
Figure 8:
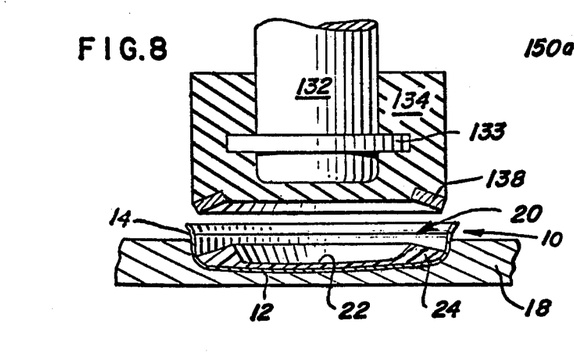

Similar to the first embodiment discussed above, the alternate embodiments' sealing edge and elastomeric material have an outer diameter generally equal to the diameter of the bottom portion of the shell 10 so that as the punch 132 is reciprocated downwardly, the sealing edge forms an outer boundary for the thermoplastic material, FIG. 6. As the punch 132 moves downwardly after the shell 10 has been sealed, the transitional portion 136 of the elastomeric material is compressed by the annular flange 133, and the elastomeric material immediately below the punch compresses the mass of thermoplastic material 16 to cause it to flow and assume a shape complementary to the working surface of the plunger. With reference to FIG. 7, it will be appreciated that the elastomeric material 134 immediately below the ends of the punch 132 is compressed to a greater extent than the elastomeric material within the transitional portion 136 due to the lesser amount of material beneath the punch, as compared to the material in the transitional portion.

After the punch 132 has moved to its lowest position, either due to a mechanical stop or the incompressibility of the thermoplastic material, the punch moves upwardly releasing the compressive force on the elastomeric working surface. As the punch 132 continues to move upwardly, the sealing edge 138b is taken out of engagement with the shell and the entire plunger assembly is removed from the shell, FIG. 8.

Figure 9:
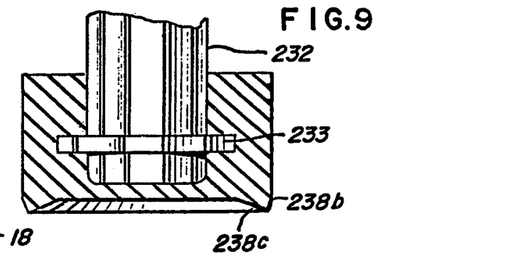
FIG. 9 is a front elevational view, partially in section, of a third modified embodiment of a plunger structure.

As has been noted, the punch 132 may be polygonal in cross-section, as illustrated in FIG. 9, by punch 232, and the annular flange 133 may either be circular in cross-section or polygonal 233, as illustrated in FIG. 9. The sealing means may be a frusto-conical shaped washer, as discussed above, but it is within the scope of the present invention to treat the edges of the elastomeric material so as to harden them to form an equivalent sealing surface 238b and a frusto-conical shaped peripheral working surface 238c.

Figure 10:
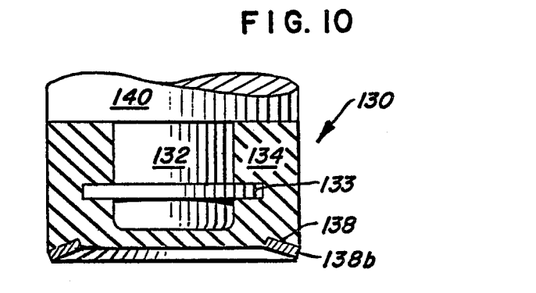
FIG. 10 is a front elevational view, partially in section, of another plunger structure.
Figure 11:
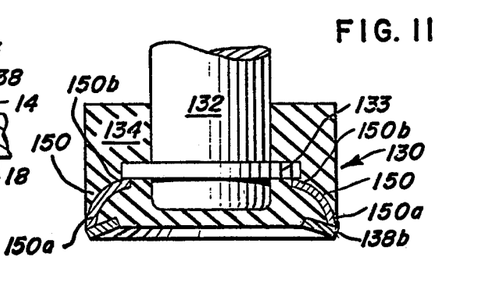
FIG. 11 is a front elevational view, partially in section, of a further modified embodiment of a plunger structure.

Referring to FIGS. 10 and 11, depending upon the modulus of the elasticity of the elastomeric material, it may be desirable to provide increased loading at the sealing edge 138b of the washer. To this end, the punch 132 (FIG. 10) is provided with an annular shoulder 140. Shoulder 140 corresponds in diameter to the elastomeric material 134 which is in abutting relationship with the lower surface of the shoulder. The shoulder 140 extends radially beyond the flange 133 so that there is an overlying relationship between the outer periphery of the shoulder and the washer 138. As the plunger 130 moves downwardly into the shell, the sealing edge 138b will engage the shell and be resiliently loaded by the elastomeric material directly above the washer due to the influence of shoulder 140 as the plunger continues to move downwardly. This additional loading to the washer 138 assures that the thermoplastic material will not "flash" out under the sealing edge 138b as it flows under the compressive influence of the plunger.

A further alternate embodiment of the invention is illustrated in FIG. 11 which utilizes a plurality of leaf springs 150 which are embedded in the elastomeric material 134. One end 150a of the leaf springs is attached to the upper peripheral surface of the washer 138 and the other end 150b of the spring contacts the lower surface of the annular flange 133. In this manner, the springs 150 are compressed by the flange 133 as the plunger 130 moves downwardly into the shell after the sealing edge 138b has engaged the shell.

FIGS. 12 through 15 illustrate a still further embodiment of the present invention in which the elastomeric material 334 is in a precompressed state to provide improved sealing between the plunger 332 and the elastomeric material. In this embodiment plunger 332 provides a generally circular-shaped working surface 332a at its lower end which corresponds in diameter to the diameter of the central portion 22 of the insert to be formed. The shaft portion 332b of the plunger is of a reduced diameter and merges with working surface 332a at a ledge including an outwardly tapered portion 332c and an upwardly facing projection 332d at the end of the tapered portion.

Figure 12:
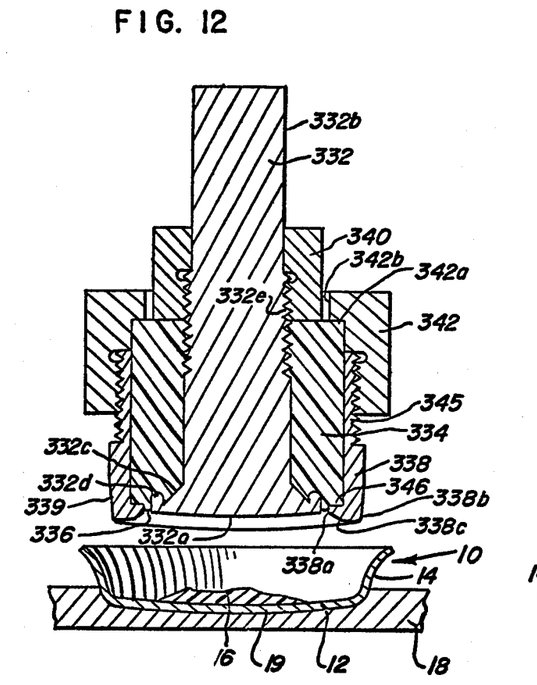
FIGS. 12, 13, 14 and 15 are vertical sectional views of another plunger structure illustrating its operation in positions similar to those shown in FIGS. 1, 2, 3 and 4, respectively.

Elastomeric material 334 is generally cylindrical in shape having an inner diameter corresponding to the shaft diameter of the punch and which is formed with a taper corresponding to tapered portion 332c at its interior lower edge so that the elastomeric material may be positioned thereon.

In this embodiment, the elastomeric material 334 is precompressed against the tapered portion 332c and protrusion 332d to provide sealing engagement therebetween during the insert forming operation. To this end shaft portion 332b is provided with a threaded midportion 332e adjacent the upper portion of the elastomeric material and a collar 340 is threaded thereon to precompress the elastomeric material.

The sealing means utilized in this embodiment is in the form of a generally cylindrical member 338 which has an outer diameter defined by tapered surface 339 terminating at a sealing edge 338b, generally corresponding to the diameter of the bottom of the shell. Inner edge 338a of member 338 is formed on a diameter slightly larger than the diameter of the working surface 332a to provide a gap therebetween. A working surface 338c corresponding to the shape of the annular bead or cushion pad 24 to be formed is provided between edges 338a and 338b. Member 338 is mounted on elastomeric material 334 by a threaded collar 342 which engages the upper edge of the elastomeric material by means of a horizontal surface 342a. Collar 342 is threaded to a corresponding thread portion 345 at the upper end of member 338 to cause the elastomeric material to be compressed between surface 342a and upper surface 346 of member 338 to provide sealing engagement of the elastomeric material on surface 346.

The diameter of collar 342 at the upper portion thereof, defined by vertical surface 342b, is greater than the diameter of collar 340 to allow the punch and collar 340 to move relative to collar 342 during the insert forming operation.

The diameter of working surface 332a is less than the diameter of edge 338a to provide a gap therebetween into which a portion of the elastomeric material is precompressed by collar 340 to provide annular bulbous-shaped transition region 336.

Figure 13:
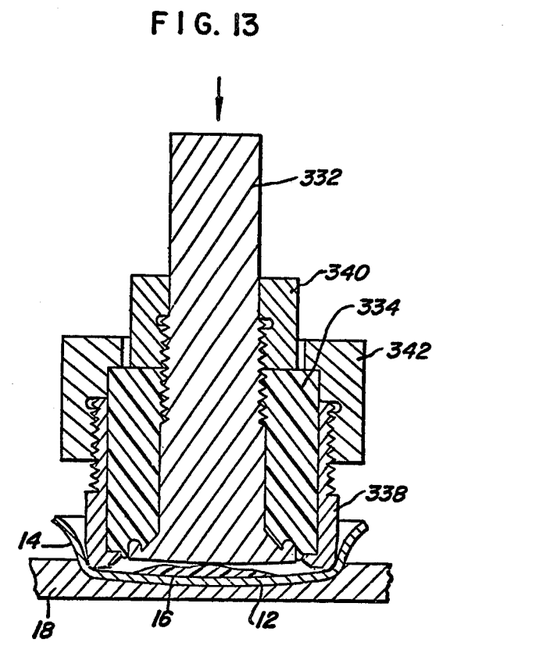
Figure 14:
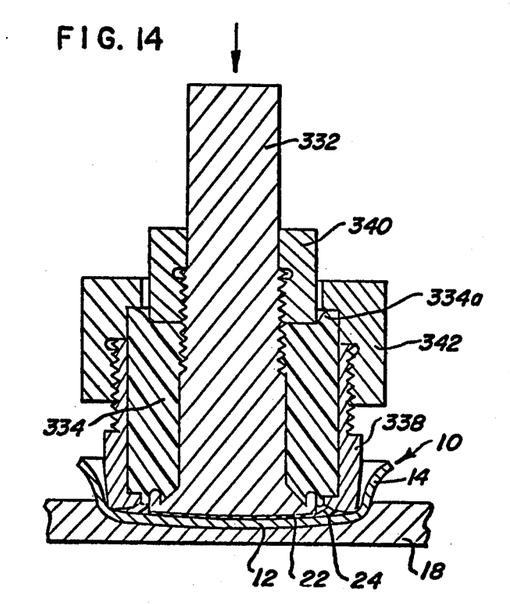

Referring to FIG. 13, when plunger 332 is lowered into a shell disposed therebeneath, edge 338b engages the bottom of the shell to form an outer boundary for the insert. As the plunger continues to move downwardly, FIG. 14, working surface 332a starts the thermoplastic material 16 flowing and the plunger moves downwardly relative to member 338 to form the central portion 22 of the insert. Since the elastomeric material is precompressed by collar 340, the transition portion 336 will remain during the insert forming operation although the material is flexed as at 334a. Due to the presence of the bulbous protrusion at the transition zone 336, the annular bead or cushion pad 24 will be formed with a slightly concaved portion 24a corresponding to the position of the transition zone 336. As with the prior embodiments, working surface 338c and transition zone 336 cooperate to form the cushion pad 24 and thus complete formation of the insert.

Figure 15:
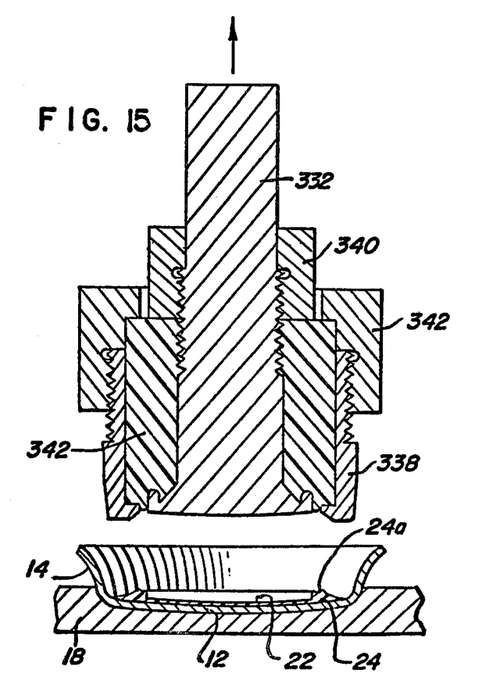

As the plunger is raised upwardly, FIG. 15, working surface 332a returns to its initial position due to the resilient elastomeric material 334. It will be appreciated that in this embodiment, tapered surface 339 facilitates in the alignment of the crown beneath the plunger, and member 338 may move relative to the plunger to accommodate for any skewness which may be present between the plunger and the crown.

The preferred embodiment is illustrated in FIGS. 16 through 19, wherein the elastomeric material 434 is in a precompressed state to provide improved sealing between plunger 432 and elastomeric material 434. Plunger 432 is a rigid reciprocal punch and provides a generally circular-shaped working surface 432a at its lower end which corresponds in diameter to the diameter of the central portion 22 of the insert to be formed. The lower portion 432f of the plunger forms a head portion, and has working surface 432a on the bottom, an upper surface 432g along a peripheral portion, and a side wall 432h. Shaft portion 432b of plunger 432 is of a reduced diameter and is positioned above head portion 432f. The difference in diameter between head portion 432f and shaft portion 432b defines the width of the upper surface 432g of the head portion.

Figure 16:
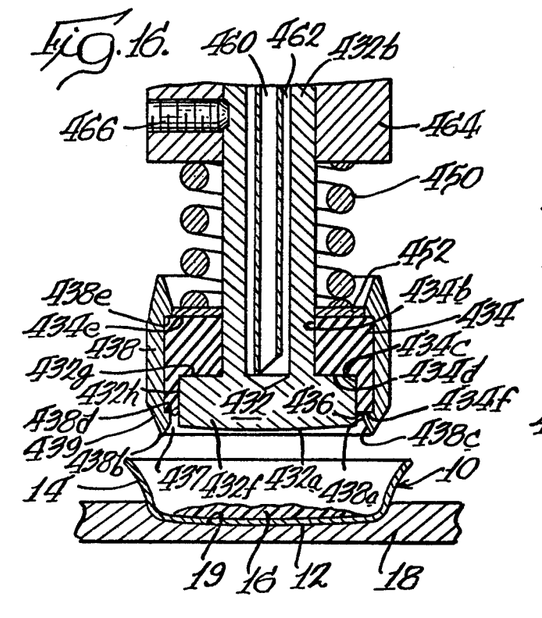
FIGS. 16, 17, 18 and 19 are vertical sectional views of yet another plunger structure illustrating its operation in positions similar to those shown in FIGS. 1, 2, 3 and 4, respectively.

Elastomeric material 434 is generally cylindrical in shape and has an outer diameter greater than the diameter of head portion 432f of plunger 432, an inner diameter corresponding to the diameter of shaft 432b along a portion 434b, and an inner diameter corresponding to the diameter of head portion 432f along a portion 434c. Elastomeric material 434 is concentrically positioned around and frictionally engages the shaft 432b and a portion of head 432f, has an upper surface 434e and has a lower surface 434d abutting upper surface 432g of head portion 432f, and a lower surface 434f along the portion of its diameter which exceeds the diameter of head portion 432f.

A generally cylindrical rigid member 438 forms the sealing means in this embodiment and has an outer diameter including a tapered surface 439 terminating at a sealing edge 438b, generally corresponding to the diameter of the shell bottom interior. Inner wall 438a of member 438 preferably has a diameter slightly larger than the diameter of working surface 432a to provide a gap 437 therebetween. Sealing member 438 also has a working surface 438c between inner wall 438a and sealing edge 438b which corresponds to the shape of the annular bead or cushion pad 24. A central portion of sealing means 438 has an inner diameter generally corresponding to the outer diameter of elastomeric material 434 and is disposed about the same. Sealing member 438 preferably has a lower ledge 438d facing upwardly and abutting a portion of lower surface 434f of the portion of elastomeric material 434 which is greater in diameter than head portion 432f of the plunger. An upper ledge 438e on rigid member 438 faces downwardly and abuts a peripheral portion of upper surface 434e of the elastomeric material. Both the lower and upper ledges have an inside diameter which is less than the inside diameter of the central portion of sealing means 438.

Elastomeric material 434 is held in a precompressed state by a precompressed spring 450 which preferably rests at one end against a washer 452 and at the opposite end against plunger holder 464 which is secured to plunger 432 by set screw 466. Plunger holder 464 provides a facility for raising and lowering the plunger and guides the vertical movement of the plunger. Washer 452 is slightly smaller in diameter than elastomeric material 434 and corresponds in diameter to the inner edge of upper ledge 438e of sealing member 438 to allow the plunger and washer to move relative to sealing member 438 during the insert forming operation. Washer 452 aids in distributing the compressive force from spring 450 to elastomeric material 434. Spring 450 causes the elastomeric material 434 to be compressed between washer 452 and the lower ledge 438d of the sealing member to provide a sealing engagement of the elastomeric material on lower ledge 438d, and between inner wall 438a of the sealing means and head portion 432f of the plunger. Spring 450 maintains plunger 432, elastomeric material 434, and sealing member 438 in mechanical engagement, thereby obviating the need for bonding the components together.

The diameter of working surface 432a is less than the diameter of inner wall 438a of the sealing means to provide a gap 437 therebetween into which a portion of the elastomeric material 434 is precompressed by spring 450 to provide annular bulbous-shaped transition region 436 along a portion of lower surface 434f of the elastomeric material.

Figure 17:
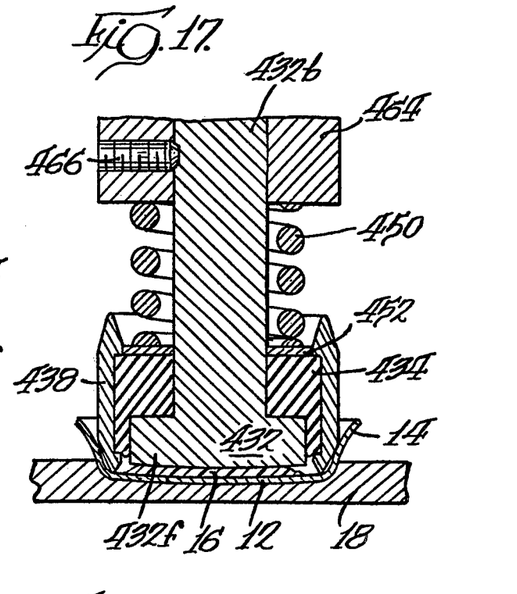

Referring to FIG. 17, when the plunger 434 is lowered into a shell disposed thereunder, sealing edge 438b of the sealing means engages the bottom of the shell to form an outer boundary for the insert. As the plunger continues to move downwardly, FIG. 18, working surface 432a starts the thermoplastic material 16 flowing and the plunger 432 moves downwardly relative to sealing means 438 to form the central portion 22 of the insert. Material 16 flows into gap 437 and contacts transition portion 436 of elastomeric material 434. After contacting a portion of transition portion 436, the thermoplastic material 16 continues to flow until the entire gap 437 is filled. Plunger 432 continues to move downwardly until it reaches a mechanical stop (not shown) or is stopped by the incompressibility of the thermoplastic material 16 when it achieves the shape of insert 20.

Since the elastomeric material is precompressed by spring 450, the transition portion 436 will remain during the insert forming operation although the elastomeric material is flexed as at 434a. The bulbous protrusion at the transition zone 436 will result in the annular bead or cushion pad 24 being formed with a slightly concaved portion 24a (FIG. 19) corresponding to the position of the transition zone 436. Working surface 438c of the sealing means cooperates with transition zone 436 to form the cushion pad 24 and thus complete formation of the insert.

Figure 19:
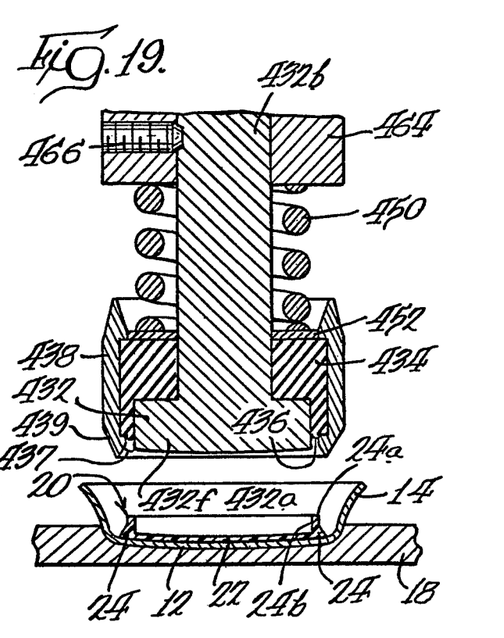

As illustrated in FIG. 19, plunger 432 is raised upwardly and the elastomeric material 434 returns to its initial position due to its resiliency.

The tapered surface 439 on sealing member 438 facilitates in the alignment of the crown 14 beneath the plunger 432. Since there is a gap 437 positioned between sealing member 438 and plunger 432, with transition zone 436 of elastomeric material 434 filling a portion of the gap, sealing member 438 may move relative to plunger 432 to accommodate for any skewness which may be present between the plunger and the crown.

The inner wall 24b of the annular bead of cushion 24 is approximately vertical, and thereby economizes the amount of plastic material 16 which is needed to form the insert. The tapered shape of working surface 438c of the sealing member contributes to a further economization of plastic material 16.

Figure 18:
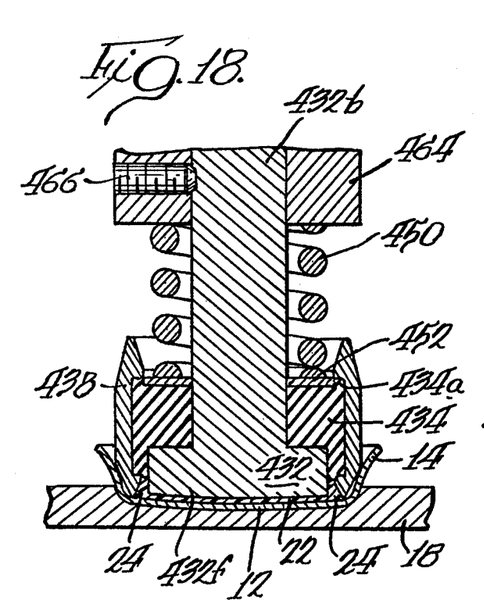

As shown in FIGS. 17 through 19, plunger 432 may be solid. It is preferred, however, that plunger 432 have a cylindrical void extending the length of the shaft portion 432b and along a portion of the length of head portion 432f, as illustrated in FIG. 16. Water, or other fluid, enters through a tube 460 positioned within the cylindrical void and having an outer diameter less than the diameter of the void, and exits through passage 462 between tube 460 and the inner wall of shaft portion 432b of plunger 432. The water facilitates in cooling the plastic 16, which is initially in a molten state. By minimizing the contact between the plastic 16 and the elastomeric material 434, which is a poor conductor of heat, and maximizing the contact between plastic 16, and the plunger 432 and sealing member 438, both of which are preferably formed of hardened tool steel or beryllium copper which are good conductors of heat, the time required to cool the plastic is minimized. Since the plunger must remain in the depressed position illustrated in FIG. 18 until the plastic is sufficiently hardened, the rate of production of shells with inserts can be increased by minimizing the time required to cool the plastic.

The elastomeric material 434 could have a constant inner diameter of the height of the elastomeric material were reduced, or the height of head portion 432f were increased so that the entire inside surface of the elastomeric material abuts the sidewall 432h of the head portion of the punch. By altering the configuration of the punch, a corresponding change in the shape of the elastomeric material would be required.

From the above disclosure it is readily apparent that the embodiments disclosed provide crown insert forming plungers which are more economical from a capital outlay standpoint and which solve the skewness and misalignment problems which have been present in the field. These and other embodiments may be suggested and utilized by those silled in the art without department from the scope and spirit of this disclosure.

I claim:

1. The method of forming thermoplastic material disposed in a closure shell into a predetermined shaped sealing insert with a cushion pad therein, said shell having a bottom portion and a sidewall comprising the steps of: providing an insert plunger having a working surface with at least a partially deformable interior portion, said working surface having an outer diameter generally equal to the diameter of said bottom portion; resiliently engaging the periphery of said working surface with the interior of said shell to enclose said material within the said working surface and bottom portion to form an outer boundary for said insert; and flexing said deformable portion of said working surface and pressing said working surface against said thermoplastic material to produce flow thereof, whereby said working surface assumes a shape complementary to said predetermined shape to form the insert.

2. The method of claim 1, wherein said flexing step includes compressing said deformable portion.

3. The method of claim 1, wherein said flexing step includes stretching said deformable portion in tension.

4. The method of claim 1, wherein said insert plunger is provided with a generally concave working surface.

* * * * *